(12) United States Patent
McLemore et al.

(10) Patent No.: US 6,752,303 B2
(45) Date of Patent: Jun. 22, 2004

(54) CARRIER DEVICE

(76) Inventors: John D. McLemore, 105 Hickory Ct., Fortson, GA (US) 31906; Don McLemore, 450 Brown Ave., Columbus, GA (US) 31906

( * ) Notice: Subject to any disclaimer, the term of this patent is extended or adjusted under 35 U.S.C. 154(b) by 0 days.

(21) Appl. No.: 10/157,040

(22) Filed: May 30, 2002

(65) Prior Publication Data

US 2003/0222112 A1 Dec. 4, 2003

(51) Int. Cl.$^7$ ................................................ B60R 9/00
(52) U.S. Cl. ..................................... 224/521; 224/924
(58) Field of Search ................................. 224/521, 924

(56) References Cited

U.S. PATENT DOCUMENTS

| | | |
|---|---|---|
| 3,163,339 A | 12/1964 | Merchant |
| 3,989,265 A | 11/1976 | Smiley |
| 4,046,398 A | 9/1977 | Dunwoody |
| 4,204,702 A | 5/1980 | Oltrogge |
| 4,318,501 A | 3/1982 | Graber |
| 4,381,069 A | 4/1983 | Kreck |
| 4,702,401 A | 10/1987 | Graber et al. |

(List continued on next page.)

FOREIGN PATENT DOCUMENTS

GB     2 235 909 A     3/1991

OTHER PUBLICATIONS

"Outdo or Cooking Made Simple, e.g. Gas & Charcoal Smokers—Turkey Fryers—Fish Fryers, Camp Cookers—Cookware—Spices—Videos—Cargo Carriers", 1992, pp. 1–22, Masterbuilt Mfg. Inc., Camping Supply Publication (25 Years).

Camping World "Master 1997" brochure, p. 36.

Copy of U.S. patent application Ser. No. 09/643,877, filed Aug. 23, 2000.

*Primary Examiner*—Jes F. Pascua
(74) *Attorney, Agent, or Firm*—Smith, Gambrell & Russell, LLP

(57) ABSTRACT

A bike carrier device that has a vehicle connection bar such as one for trailer hitch securement and a cross frame structure preferably having a set of first and second cross bars that each extend to opposite sides of the connection bar and are spaced apart in a direction of elongation of the connection bar. The first and second cross bars are preferably interconnected by one or more interconnection bars that preferably extend transverse to the cross bar and are integrated with the cross bars and preferably provide sliding support relative to one or more vertical stabilizing bars having looped strapping threading and fixation devices in an upper region for bike frame stabilization strapping. The cross frame structure is supported on the vehicle connection bar such as through fasteners extending through the stacked cross frame structure and connection bar at the two intersection points of the cross bars (or extensions of the cross frame structure) with the connection bar. Side rails are provided (preferably on each free end of a double H-shaped configured cross frame structure) to providing underlying bike support such as by tire contact with opposite side rails supported by the cross bars which are insufficient in length (e.g., less than 2 feet) to provide tire contact support. The side rails also preferably support cradles and/or tire strap downs which straps can also be used with the stabilization bars. A method of assembling this bike carrier is also discussed.

39 Claims, 4 Drawing Sheets

U.S. PATENT DOCUMENTS

| | | | |
|---|---|---|---|
| 4,815,638 A | 3/1989 | Hutyra | |
| 4,823,997 A | 4/1989 | Krieger | |
| 4,875,608 A | 10/1989 | Graber | |
| 4,938,399 A | 7/1990 | Hull et al. | |
| 5,025,932 A | 6/1991 | Jay | |
| 5,038,980 A | 8/1991 | Baldeck | |
| 5,118,018 A | 6/1992 | Baldeck | |
| 5,232,134 A | 8/1993 | Allen | |
| 5,269,446 A | 12/1993 | Biehn | |
| 5,282,555 A | 2/1994 | Muir et al. | |
| 5,373,978 A | 12/1994 | Buttchen et al. | |
| 5,377,886 A | 1/1995 | Sickler | |
| 5,395,020 A | 3/1995 | King | |
| 5,460,304 A | 10/1995 | Porter et al. | |
| 5,469,997 A | 11/1995 | Carlson | |
| 5,476,202 A | 12/1995 | Lipp | |
| 5,476,203 A | 12/1995 | Fletcher | |
| 5,497,927 A | 3/1996 | Peterson | |
| 5,549,231 A | 8/1996 | Fletcher et al. | |
| 5,560,526 A | 10/1996 | Jantzen et al. | |
| 5,570,825 A | 11/1996 | Cona | |
| 5,593,139 A | 1/1997 | Julian | |
| 5,647,521 A | 7/1997 | Burgess | |
| 5,649,656 A * | 7/1997 | Davy | 224/405 |
| 5,690,260 A | 11/1997 | Aikins et al. | |
| 5,695,103 A | 12/1997 | Duvernay et al. | |
| 5,699,985 A | 12/1997 | Vogel | |
| 5,775,555 A | 7/1998 | Bloemer et al. | |
| 5,810,542 A | 9/1998 | Ostrander | |
| 5,820,004 A | 10/1998 | Lane | |
| 5,833,074 A | 11/1998 | Phillips | |
| 5,850,959 A | 12/1998 | Miller | |
| 5,862,966 A | 1/1999 | Mehls | |
| 5,871,131 A | 2/1999 | Low et al. | |
| 5,879,102 A | 3/1999 | Koliopoutos | |
| 5,881,937 A | 3/1999 | Sadler | |
| 5,884,824 A | 3/1999 | Spring, Jr. | |
| 5,884,930 A | 3/1999 | Cluth | |
| 5,899,655 A * | 5/1999 | Miller et al. | 414/462 |
| 5,938,092 A * | 8/1999 | Johnson | 224/521 |
| 6,006,973 A | 12/1999 | Belinky et al. | |
| 6,047,869 A * | 4/2000 | Chiu | 224/314 |
| 6,070,926 A * | 6/2000 | Hardin | 296/26.08 |
| 6,126,053 A * | 10/2000 | Shaver | 224/509 |
| 6,193,124 B1 * | 2/2001 | Brazil et al. | 224/521 |
| 6,237,824 B1 * | 5/2001 | Bagley | 224/521 |
| 6,244,483 B1 | 6/2001 | McLemore et al. | |

* cited by examiner

CARRIER DEVICE

FIELD OF THE INVENTION

The present invention relates to a bike carrier with a preferred embodiment being suited for attachment to a vehicle such as by way of a trailer hitch attachment.

BACKGROUND OF THE INVENTION

A plurality of bike carrier designs have been developed including complex strap designs that position a bike on the upper surface of a bumper and rely on strap, buckle and trunk hook components to secure the bike to the body of the vehicle. Examples of this type of bike carrier can be seen in U.S. Pat. Nos. 5,118,018 and 5,038, 980. In addition to the potential damage to the vehicle created by the hook and buckle components, bike carriers of this type are generally limited to single bike support and also often involve a great deal of set up and adjustment.

The prior art also features bike carriers that are designed to extend out away from the rear end of a vehicle from an attachment point in the bumper region of the vehicle such as from a square hitch common on many vehicles, particularly sports utility vehicles or SUV's. Many of these bicycle carriers include carriers with a relatively lengthy vertical main support bar from the top of which extends horizontal support beams that are provided with clamps or the like to attach to a bicycle generally in an upper region of its frame. Examples of this type of bicycle carrier can be seen in U.S. Pat. Nos. 5,476,202; 5,469,997 and 5,373,978. The reliance on bike frame clamps as the sole means of connection can introduce, however, the potential for undesirable degradation of the more susceptible painted frame regions of bicycles and/or the need for expensive materials that are non-scratching and yet also sufficiently weather resistant.

Carriers that attach to a rear end of a vehicle also include carriers that are not designed for attachment to the upper or internal frame structure of a bicycle or other wheeled appliance, but are designed for providing an underlying platform on which the bicycle can be positioned. Prior art examples of this latter type of bicycle carrier include, for example, U.S. Pat. Nos. 5,025,932; 5,377,886 ; 5,497,927; and 5,570,825. While these type of carriers typically avoid the drawback of having clamps connecting directly with the bicycle's upper, interior frame structure, they generally suffer from a plurality of other problems, such as being (1) often highly complex in design; (2) not well suited for avoiding tilting of bikes (e.g., motorbikes or bicycles once loaded); (3) not well suited for ease in bike loading; (4) bulky to the extent of presenting difficulties from the standpoint of, for example, shipping, retailer shelf space requirements and high customer handling weight; and/or (5) formed of a large number of unique components making for high manufacturing and purchase costs as well as difficulty in customer assembly or requiring a large deal of costly pre-assembly by the manufacturer.

SUMMARY OF THE INVENTION

The present invention features a carrier device that is directed at helping to avoid or alleviate various problems such as those described above as being associated with the prior art. The present invention features a carrier device, which in one preferred embodiment, is a bike carrier that is suited for attachment to a rear end of a vehicle such as by way of, for example, a hitch, tow ball platform or bumper attachment. A preferred embodiment of the present invention features a multi-component carrier which is easy to assemble, remove and/or break down and which is highly versatile in accommodating a variety of bike sizes and shapes and, yet, is also user friendly in allowing for ease of moving and positioning the adjustable components, and rapid bike securement.

The present invention has the advantage of being able to have a compact break down arrangement by way of, for example, reduced and common sizing for many of its components, which is beneficial from the standpoint of, for example, shipping container and storage requirements (particularly from the standpoint of minimizing retailer shelf storage space requirements which is at a premium). The arrangement of the present invention is also able to provide numerous bike carrier advantages while still making efficient use of its components so as to avoid the introduction of too large a number of components, particularly a large number of different designed components, which, again, avoids many of the manufacturing, assembly and use difficulties associated with the prior art. Preferred embodiments of the present invention also avoid lengthy and/or heavy single piece components and thus facilitates low stress operator handling.

The present invention also provides a design that allows for rapid loading and unloading of one or more bikes while still providing high stability and position maintenance assurance to the user.

A preferred embodiment of the present invention features a vehicle connection member preferably in the form of a connection bar such as a tubular bar having an end with means for attachment to a vehicle attachment support (e.g. a tubular bar sized for insertion into a vehicle receiver hitch and with aligned receiver hitch pin apertures in the side walls of the bar).

The connection bar provides support (preferably underlying support) to a cross frame structure. The cross frame structure is preferably a multi-frame element structure featuring a first set of frame elements running more transverse than parallel with respect to the connection bar and a second set of frame element(s) running more parallel to the connection bar than the first set of frame elements. In a preferred embodiment, the first set of frame elements of the cross frame structure comprises a pair of bars or cross-bars (e.g. hollow, tubular bars preferably with a quadrilateral cross-section) which are spaced apart relative to the length of elongation of the connection bar and which are positioned transverse to the direction of elongation of the connection bar.

The first pair of bars, which are elongated in the direction transverse to the connection bar, each extend out to opposite sides of the connection bar with the connection bar preferably contacting an intermediate region of each of the first pair of bars (e.g. each side of each of the cross-bars extending out an equal length to respective sides of the connection bar).

The second set of frame elements of the cross frame structure is preferably comprised of a second pair of bars (or interconnecting bars) extending between and in contact with the cross-bars. In a preferred embodiment the interconnecting bars extend transverse to the cross-bars and thus parallel with the connection bar and in-between the two spaced apart cross-bars. The interconnecting bars are spaced apart along the length of the cross-bars preferably to an equal amount inward of respective ends of the cross-bars and also outward of the central point of each cross-bar. Also, the interconnecting bars are preferably spaced away from adjacent respective sides of the connection bar to leave an opening on each side of the connection bar when the cross frame structure is attached to the connection bar. For example, a high stability cross frame structure can be achieved with the interconnecting bars positioned at an intermediate location within respective half sections of the cross-bars (e.g. one quarter in from each end) which halves extend to opposite sides of the connection bar when mounted. Thus, in a preferred embodiment, a double H-frame structure is formed.

The cross frame structure is also preferably formed as a unitary or monolithic member such as by way of welding the interconnecting bars to the cross-bars. Also, the cross-bars are each unitary bars which preferably have connection bar connection means such as bolt holes extending through upper and lower surfaces of an intermediate area of each of the cross-bars for alignment with spaced (preferably pairs) of bolt holes in the connection bar. Also, while less preferred from the standpoint of ease of assembly and structural integrity, the cross-bars and the interconnecting bars can be bolted or otherwise releasably secured (as opposed to a non-releasable arrangement such as in the above noted welded embodiment).

In a preferred embodiment, the cross-frame structure to connection bar connection means provides for one of the cross-bars being positioned so as to be generally commensurate with the free end of the connection bar while the second of the cross-bars is located in an intermediate location of the connection bar. Because of the preferred integrated or unitary nature of the cross frame structure, the two connection locations between the respective cross-bars and the preferably underlying connection bar results in torsion absorption in that the spaced apart connection points of the unitary cross frame structure to the connection bar precludes rotation of the cross frame structure relative to the connection bar.

For low weight, packaging and shelf space purposes, for example, the length of elongation of the cross-bars is made less than the typical length between bicycle front and rear wheel contact points with respect to an underlying support surface(s). With this preferred feature of the cross frame structure, the present invention also preferably includes at least one side rail extending off from the cross-bars and preferably two (one on each end) extending off from the ends of each of the cross-bars. In a preferred embodiment, each cross-bar has a first side rail extending from one end and a second side rail extending from an opposite end of that cross-bar.

For added support surface, the cross frame structure is preferably secured to the upper surface of the connection bar. With this arrangement between the cross-bars and connection bar, it is preferable to have the side rails secured to an underside of the cross-bar ends as this provides for vertical compactness in the assembled bike carrier and a lower bike positioning for added rear window visibility. The attachment means for attaching the side rails to each end of each of the cross-bars is preferably the same for each side rail/cross-bar combination and designed to prevent rotation (e.g. a pair of spaced apart aligned bolt holes in the side rail which correspond to aligned bolt holes in the ends of the cross-bars; although the present invention features other attachments including, but not limited to, other non-rotation connectors such as key-slot with or without bolting, etc). A telescoping arrangement between the side rails and cross-bars is also a feature of an alternate embodiment of the present invention, but a telescoping arrangement entails either the side rails or cross-bars being enlarged (at least at the ends) to receive the telescoping recipient, which is generally less preferable from a material and weight standpoint and component manufacturing requirements.

In a preferred embodiment, the cross-bars have intermediate (e.g. true center) connection points with an underlying connection bar such that the cross-bar halves extend equally out to opposite sides of the connection bar. With this preferred embodiment, there is provided left and right side rails. Also, in a preferred embodiment of the invention, the length of each of the side rails is the same as that of the connection bar and to each other. This arrangement facilitates packaging in that the ends can be commonly held in place by a box structure's side walls (or non-specialized protection package insert such as a thin rectangular foam block or blocks or a thickened cardboard or added cardboard box side wall sheet) and provides for efficient retail shelf size usage. In a preferred embodiment the length of the cross-bars is also made to equal the side rails and connection bar to even further enhance packaging, compactness, and versatility. In an alternate embodiment, the cross frame structure length is even further reduced and the side rails are of a length which is longer than that of the cross-bars. Also, in another preferred embodiment of the invention the cross-section (e.g. vertical when mounted) thickness of the cross-bars (and preferably equal sized/shaped interconnecting bars) is the same as that of the side rails and with each being preferably less than that of the connection bar. One preferred embodiment features the thickness of the side rails and cross-bars being half that of the connection bar such that a double stack of the side rails on the cross frame structure during shipping equals the thickness of the connection bar (again simplifying the packaging). An alternate embodiment (better suited for smaller 1¼ hitches) features a connection bar which is greater in thickness by a ¼ inch or of the same thickness relative to the cross-bars and/or the below described side rails.

A preferred arrangement of the invention also features side rails connected to the cross-bars with securement devices (e.g. fasteners such as a combination of carriage bolts, nuts and washers) working in conjunction, with, for example, aligned holes as the attachment means which are provided in both the end regions of the cross-bars and the end regions of the side rails. With carriage bolts it is preferable to have one hole squared so to lock the carriage bolt head while the remaining aligned holes are circular. Also, to facilitate the avoidance of torsion rotation of the side rails relative to the supporting cross-bars, it is preferable to have a spaced, pair of aligned hole sets in the side rail and cross-bar ends are provided for reception of the securement devices in each set.

The side rails are elongated to a sufficient length to provide for bike wheel tire support to opposite sides of the connection bar (preferably with the end-to-end distance of a larger bike model being commensurate with or more than the total end to end distance between the side rails and attached common cross-bar). Any extension of a tire wheel past the free end of a side rails is preferably accommodated by the extension of a wheel cradle outward of both the tire to underlying support contact point and the free end of the side rail. The wheel cradles are also preferably slideably adjustable and then fixable in position on the side rails. Also, a series of adjustment holes in the cross-bars and side rails is also a feature of the present invention, but a single side rail to cross-bar securement arrangement such as by way of a pair of spaced nut and bolt securement devices is well suited for most intended usages of the present invention, particularly when utilizing adjustable cradles which can readily accommodate different (end to end) sized bicycles.

Thus, in the present invention, there is also preferably included tire cradles such as one for each pair of side rails or more preferably one cradle for each side rail. The cradles preferably comprise looped U-shaped or V-shaped ends with an inclined, divergent bar extension which angles down and inward into a secured arrangement (e.g. weld) with a cradle fastener. The cradle fastener is preferably an adjustable fastener such as a U-shaped bracket designed to conform (e.g. multi-surface frictional contact) with the top and preferably also the two sides of the side rail. A bolt and nut combination such as described above is preferably provided to the cradle's position fixation bracket as a fastener to achieve compressive retention on the side walls of the bracket against the corresponding surfaces of the side rail upon reaching a desired location for the tire cradle on the side rail. The bolt and nut securement means is preferably positioned on an extra extension of the bracket's side wall which is sufficiently elongated to extend below the lower surface of the side rails. For example, aligned holes are provided in the lower third or half of the bracket so as to line up under the bottom of the side rail. Various other tire securement devices are also contemplated under the present invention, such as the use of straps either alone or in combination with cradle structures, over-center clamps, etc. Cradle usage is, however, preferred as it allows for relatively short side rail lengths while still providing end-to-end bike support and prevention of tire tilting or tire rotation about the tire contact point.

In a preferred embodiment of the present invention there is further provided one or more stabilizing bars (preferably a total of two) which are designed to extend vertically up off the bike carrier side rails, cross frame structure and/or connection bar. In a preferred embodiment, which has advantages such as easy adjustment and good bike and stabilizer bar stability (e.g. a side-to-side arrangement with a bike frame or plurality of bike frames with adjacent positioned stabilizing bars) the stabilizing bars are adjustable in base position and preferably not relied on, at least directly, for bike weight support. That is, the stabilizing bars are preferably used as a means for maintaining relative vertical bike alignment and/or horizontal plane bike spacing and the stabilizing bars are therefore preferably not relied upon for weight support. The stabilizing bars also provide a ready location for bike locking which would avoid immediate bike pull off theft.

In a preferred embodiment, the stabilizing bars are adjustably supported on the cross frame structure, and even more preferably on the interconnecting bars such as one stabilizing bar for one interconnecting bar and a second stabilizing bar for a second stabilizing bar. The stabilizing bar can be adjusted so as to have one immediately adjacent the exterior of an interior supported bike and a second one immediately interior of an exterior mounted bike.

There can also be avoided, if desired, direct and/or continuous bike frame contact between the stabilizing bars and bike frame either in having the bars spaced and only used in the event of serious movement (e.g. tilting) of the bikes and/or with bridging strapping between the stabilizing bars and connected ("wrapped") to the bike frame. Alternatively, a direct side contact arrangement (e.g. a contact sandwich arrangement) between stabilizing bars and one or more bikes is also a feature under the present invention, in which case a protective coating or layer or base material which avoids bike frame scratches, is also preferably included, particularly if a stabilizing bar is intentionally maintained in direct contact with the bike frame when in an operating position. Although less preferred, rather than a flexible member such as a strap, a more rigid positioning member can extend off the stabilizing bar for engagement with a bike such as a bike frame section (e.g. a semi-rigid expandable and return flexible clamp arrangement or a fixable, non-flexible mechanical clamp arrangement).

The stabilizer bars are preferably connected at their base to respective interconnecting bars of the cross frame structure. Since the stabilizer bars are preferably relied on for stabilizing purposes and not direct support, the underlying bike support (typically bike tire contact) is provided such as by way of the underlying support of side rails. Through the use of tire cradle(s), wheel tie down straps, and/or other bike component tie down strapping as the means for underlying support and position retention of a mounted bike, the stabilizing bars are preferably utilized for stabilizing purposes such as in the event of shifting of bikes during bumpy travel or rapid accelerations/deaccelerations, or due to loose or loosened connections of the aforementioned position retention means. Thus, the stabilizing bars can provide added rotation blockage in and of themselves or more preferably through the use of strapping (e.g. single straps for one bike to one stabilizer or combinations such as a single strap extending between stabilizer bars and wrapped or connected with one or more bikes adjacent to the stabilizer bars) to achieve both internal and external rotation prevention. Loose or tight connection straps associated with the stabilizing bars are suitable for stabilizing purposes as the support and hold down functions are preferably provided without the stabilizing means. The stabilizing bars also facilitate the aforementioned avoidance of pull off bike theft in that they provide a readily accessible location for frame locking either by way of an integrate locking means (e.g. a non-removable flexible lock supported on the stabilizer bar or more preferably a means for fixing a lock such as the below described closed bar loop arrangement).

Preferably, the stabilizer bar(s) have adjustment connectors at their base such as the aforementioned support brackets of the cradles (e.g. a vertical bar welded at its bottom to a U-shaped bracket so that the bracket's top wall contacts along its lower surface the upper surface of an interconnecting bar while the two side walls of the bracket are spaced apart for frictional slide contact or side-to-side positioning relative to the side surfaces of a supporting interconnecting bar). In addition, the stabilizing bars also preferably have similar compression generating means as that described above for the cradles which compression generating or position fixing means are well suited for final adjustment position maintenance (e.g. the bolt and nut working in conjunction with aligned holes in an over extension of the bracket's side walls). Alternatively, the base of the vertical stabilizing bars include one or more flanges extending (e.g. horizontally) out from the bottom of the base and having bolt holes or the like for receiving bolts that extend into holes formed through the interconnecting bars. A series of hole sets can be provided for providing multiple positioning of the stabilizing bar relative to a supporting interconnecting bar or member. The interconnecting bar is preferably transverse to the cross-bar to facilitate the sliding adjustment of the same into a desired side of bike positioning such as one that places the stabilizing bar immediately adjacent (e.g. within 0 to 4 inches) the frame structure of the bike. Other truss-like configurations are also possible, however, for the cross-bars and interconnecting bars such as oblique oriented interconnecting bars (e.g. 30 to 60° range). A transverse arrangement, however, facilitates in most systems the manufacture and assembly of the cross frame structure into a monolithic structure (e.g. extrusion and transverse cut) and is connectable with a flat interconnecting bar end to a flat interconnecting surface of a cross-bar through welding and, thus, is preferable for most usages.

The stabilizing bars are preferably readily adjustable (e.g. lowering the compression level on a support bracket) along respective interconnecting bars, for example, to accommodate for different shaped and sized bikes. For instance, a positioning of one stabilizer bar on the end region of an interconnecting bar that is farthest from the vehicle (when the carrier is mounted thereon) and, thus, immediately adjacent a bike supported on the outer side rails and located on a preferred location of the bike frame as, depending on the front-to-rear choice of bike mounting, different frame components/orientations are presented. Another stabilizing bar on an end region of another interconnecting bar closest to the vehicle can also be positioned so as to be immediately adjacent a second inside positioned bike or the bar can be shifted more in alignment with the other stabilizing bar for dual strapping/stabilization of one bike. The present invention, thus, provides for the secure positioning of a single or multiple bikes (e.g. 2) and added assurance of the one or more bikes not tilting either in toward the vehicle (and potentially scratching or otherwise damaging the back of the vehicle) or tilting outward away from the vehicle. Depending on the number of bikes and the style of the bike, one or both of the stabilizing bars can be adjusted to various positions along the interconnecting bars to a desired position through adjustment on the supporting interconnecting bars.

The present invention also includes an arrangement where one (or more) stabilizing bar(s) is permanently secured to the interconnecting bar such as by a weld. However, this represents a less desirable alternate embodiment of the invention from breakdown and packaging standpoints, for example. A pivotable stabilizing bar arrangement is also included in the present invention such as one where the stabilizing bar's main beam is pivotable at its base down into a generally horizontal position (e.g. extending parallel with a cross-bar) and vertically lockable in an upright position (with clevis pin and hole, for example), but again less preferably from the standpoint of packaging compactness and avoiding costly manufacturing requirements is a less desirable embodiment of the invention.

The spacing between the interior surfaces of a pair of stabilizing bars on the interconnecting bars is preferably maintained so as to correspond with the strap length preferably associated with the stabilizing bars.

The stabilizing bars are preferably also dimensioned (e.g. from the upper tip to the lowest edge which can include the bottom edge of a support bracket's side wall in a preferred embodiment) of a common length as to the cross-bars and/or connection bar which can again, facilitate packaging.

The stabilizing bars also further preferably comprise, such as in an upper half portion thereof, loop members (e.g. flexible such as a wire or strapping, or rigid such as a non-flexible bent bar), or lock thread-through means which are closed off (or lockable in that state) relative to the main beam of the stabilizing bar so as to allow for further strap or lock securement (loose or not) of a bike frame or other bike component to the stabilizing bar.

Thus, the present also preferably comprises a strap member and/or lock device preferably in association with each closed loop of a stabilizing bar providing a securement point upon attachment closing of the strap or locking of a lock. The straps can be made of a suitably non-abrasive material and/or suitable padding or protecting coating can also be provided on the straps, locks and/or stabilizing bars in those areas where bike frame contact is possible.

In addition (or alternatively) to providing straps with the stabilizing bar(s) a strap is provided in a preferred embodiment of the invention in conjunction or as a replacement or a supplement to a wheel cradle. In a preferred embodiment, each cradle is provided with a closeable strap (VELCRO® fastener or buckle connector etc.) which is used about the side rail and the tire rim at the tire contact point with the side rail.

BRIEF DESCRIPTION OF THE DRAWINGS

Preferred embodiments of the present invention shall now be described with reference to the accompanying drawings in which.

DETAILED DESCRIPTION OF PREFERRED EMBODIMENTS

Figure 1:
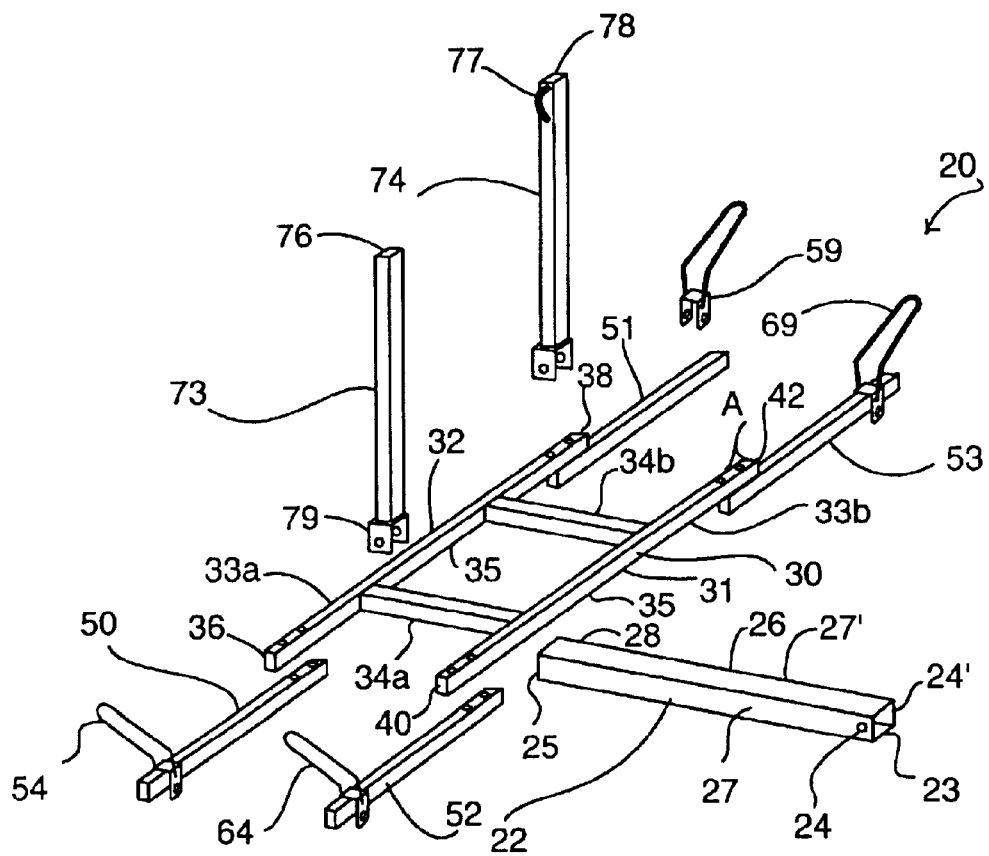
FIG. 1 shows a partially exploded view of a carrier device of the present invention.
Figure 8:
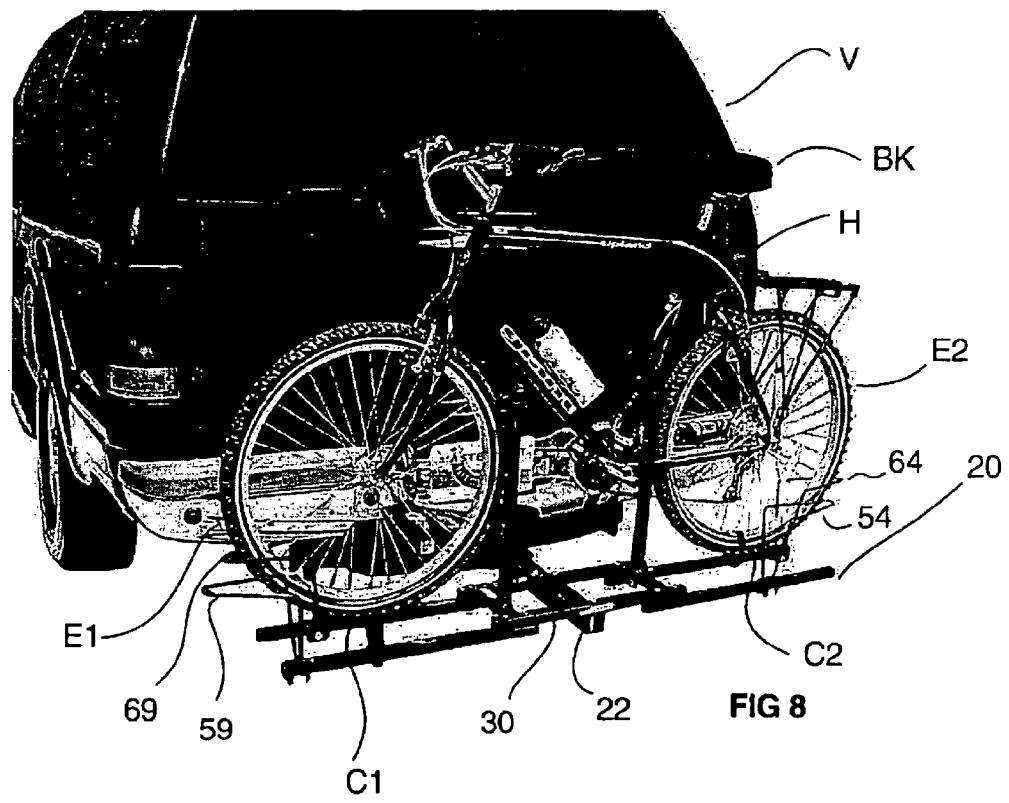
FIG. 8 shows a bike carrier of the present invention attached to the trailer hitch of a vehicle.

FIG. 1 shows a partially exploded view of a first embodiment bike carrier 20 of the present invention. The illustrated embodiment shows a carrier-to-vehicle support member 22, preferably in the form of a connection bar having a first end 23 and a second end 25. Preferably, the support beam 22 is designed for securement to the rear of a vehicle such as by way of a telescopic trailer hitch attachment (e.g. featuring a 2"×2" or 1¼"×1¼" square tubing connection) for vehicle connection and is preferably made from any sort of non-flexing, rigid material, such as metal, composites, or polymers. FIG. 8 provides an illustration of connection bar 22 in a trailer hitch attachment to vehicle V.

With an embodiment like that shown in FIG. 1, with the support member being a telescoping trailer hitch connection bar, first end 23 of bar 22 has means for attachment to a vehicle hitch or to some other similar support structure. In the preferred embodiment, the attachment means includes an aligned pair of apertures 24, 24' located on opposite lateral sides 27, 27' of the support beam 22. Apertures 24, 24' are sized to receive a clevis pin or the like (not shown) for locking connection bar 22 in position relative to the vehicle following a telescopic insertion within a reception cavity of a vehicle trailer hitch or the like. First end 23 can also have a variety of alternate vehicle attachment means so long as the vehicle attachment means provides a high level of carrier to vehicle attachment stability for the bike carrier relative to the supporting vehicle.

With reference to FIGS. 1 and 8, in particular, connection bar 22 is shown as having a first end 23 attached to the rear of vehicle V such as by way of the aforementioned trailer hitch connection. Connection bar 22 preferably has a length of less than 30 inches (e.g. 15 to 30 inches) with a length of 23 inches (e.g. a 2"×2"×23" hollow or tubular beam) being well suited for many intended uses of the present invention.

Figure 3:
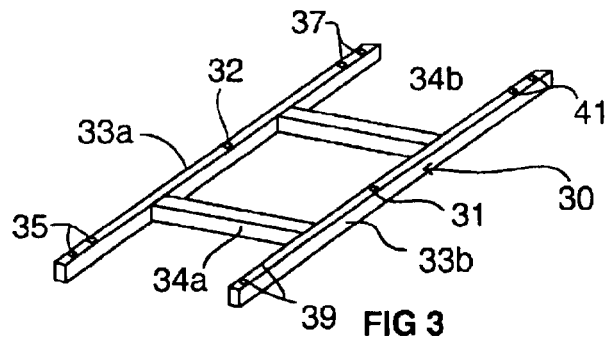
FIG. 3 shows a perspective view of an embodiment of a cross frame structure of the present invention.

FIG. 3 illustrates cross frame structure 30 which is preferably mounted to the upper surface of connection bar 22 with a preferred interior (closest to the vehicle) contact support location being at least ⅓ of the length of elongation of the connection bar rearward of the vehicle connection end 23, and more preferably in a central region (e.g., 40% to 60%) of the connection bar length rearward of the vehicle connection end 23. A second contact location between the cross frame structure and the connection bar is in the free end region of the connection bar (e.g. within a 0 to 20% length region extending inward from the outer edge of free end 25 of connection bar 22). The connection means between the connection bar and the cross frame structure can take on a variety of forms with the preferred connection means being one that is tool releasable such as a plurality of aligned holes through which one or more bolt and nut combinations extend and are fastened so as to secure the cross-bar in a stacked relationship with the connection bar.

Figure 2:
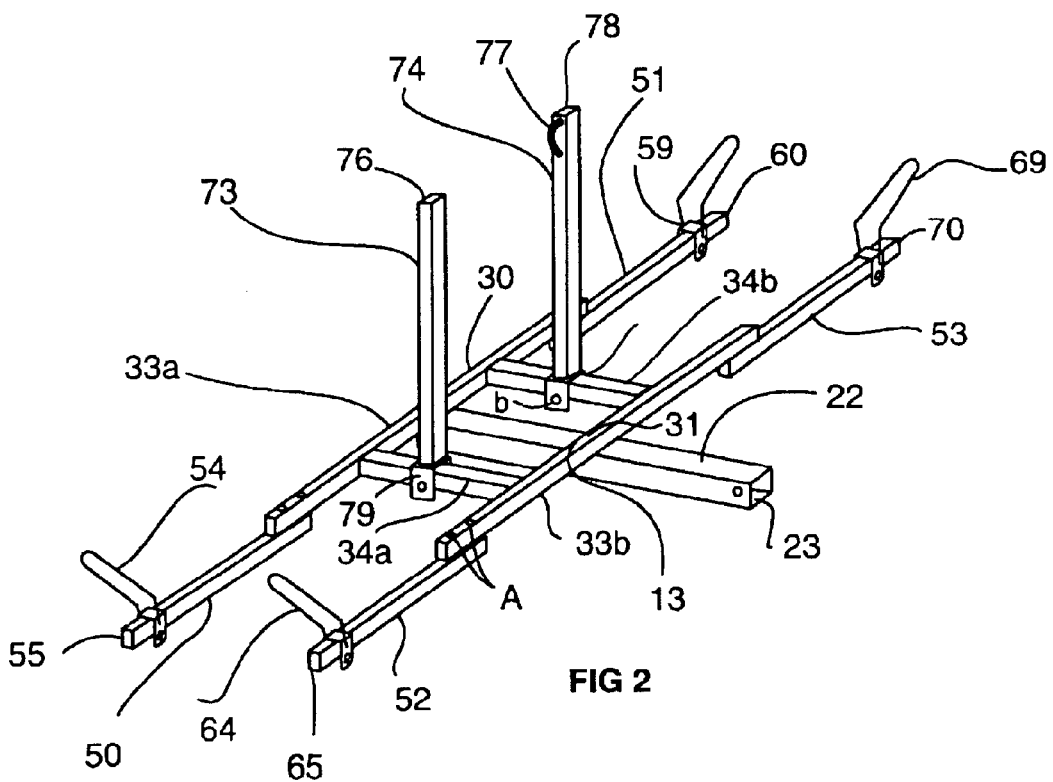
FIG. 2 shows, in perspective, the carrier of FIG. 1 in an assembled state.

Thus, as seen in FIG. 2, connection bar 22 provides support (preferably underlying support) to cross frame structure 30. As best shown in FIGS. 2 and 3, cross frame structure 30 is preferably a multi-frame element structure featuring a first set of frame elements 33a, 33b running more transverse than parallel with respect to connection bar 22 and a second set of frame elements 34a, 34b running more parallel to the connection bar 22 than the first set of frame elements 33a, 33b. In a preferred embodiment, the first set of frame elements 33a, 33b of the cross frame structure 30 comprises a pair of cross-bars (e.g. hollow, tubular bars preferably with quadrilateral cross-section) which are spaced apart relative to the length of elongation of the connection bar (e.g. a spacing of 10 to 70% of connection bar elongation and more preferably 25 to 50% and preferably on the half of the connection bar farthest from vehicle attachment) and which cross-bars are positioned transverse to the direction of elongation of the connection bar.

The cross-bars are elongated in the direction transverse to the connection bar so as to have each cross-bar extend out to opposite sides of the connection bar with the connection bar preferably contacting an intermediate region 35 of each of the cross-bars (e.g. each side of each of the cross-bars extending out an equal length to respective sides of the connection bar). Cross-bars of square 1"×1" cross-sections and an elongation of 23" are particularly well suited for many uses of the present invention and are further well suited for use in conjunction with a 2"×2"×23" connection bar. Various other cross-sections and rail length sizes are also contemplated for use under the present invention (e.g. a 2"×2" cross section cross-rails with the various rail types length being preferably of a length less than 3 feet and more than 1 foot with a 1½ to 2½ foot sub range, or 2 foot ±3 inch sub range being well suited for the present invention).

The second set of frame elements 34a, 34b of the cross frame structure is preferably comprised of a second pair of bars (or interconnecting bars) extending between and in contact with the cross-bars 33a, 33b. In a preferred embodiment, interconnecting bars 34a, 34b are dimensioned to have the same cross-sectional size and configuration as the cross-bars, but are preferably shorter in length e.g. less than 2', more preferably about 6" to 18" in length, and more preferably about 1 foot (±2 inches) relative to the cross-bars. Interconnecting bars 34a and 34b also preferably extend transverse to the cross-bars 33a, 33b and thus parallel with the connection bar and in-between the two opposing, interior sides of the two spaced apart cross-bars The interconnecting bars are spaced apart along the length of the cross-bars preferably to an equal amount inward of respective ends of the cross-bars and also outward of the central point of each cross-bar. Also, the interconnecting bars are preferably spaced away from adjacent respective sides of the connection bar to leave an opening on each side of the connection bar. For example, a high stability cross frame structure can be achieved with the interconnecting bars positioned at an intermediate location within respective half sections of the cross-bars (e.g. one quarter in from each end (with an intermediate range of ±¹⁄₁₂ of the length of the cross-bar in either direction of that ¼ location)) which halves extend to opposite sides of the overall cross-bar. For example, the center axis of elongation of the interconnecting bars are preferably spaced 4 inches to 10 inches from the center of a plane vertically bisecting the connection bar. Thus, in a preferred embodiment, the integrated cross-bars and interconnecting bars form a double H-frame structure.

Figure 7:
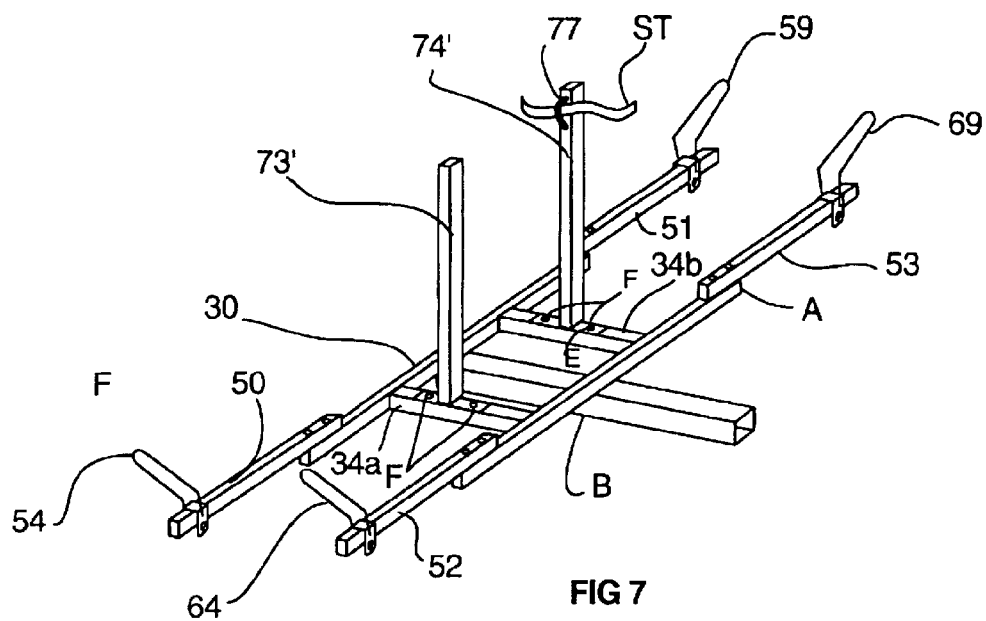
FIG. 7 shows an alternate embodiment of the present invention.

Cross frame structure 30 is also preferably formed as a unitary, non-detachable elements construction such as by way of welding the interconnecting bars to the cross-bars or by forming the elements of the cross frame structure together in a common molding or polymer wrapping process. Also, as seen from FIG. 2, the cross-bars and interconnecting bars are preferably in and of themselves each unitary bars which preferably have connection bar attachment means such as bolt holes extending through upper and lower surfaces of an intermediate area of each of the cross-bars for alignment with bolt holes in the connection bar. The attachment of cross frame structure 30 to connection bar 22 is seen in FIGS. 1 and 2 where the two aligned bolt hole sets 31, 32 (top one of each set only shown in FIG. 1) of cross-bar 30 are arranged for attachment to aligned respective bolt hole sets 26, 28 in the connection bar through use of, for example, suitable fasteners such as bolt and nut combinations, which bolts are of a length to accommodate the stacked cross-frame structure and connection bar combination and extend sufficiently out for nut threading. Reference is made to FIGS. 2 and 7 for an illustration of such fasteners or securement means with a bolt, nut and washer combination represented by "B". Also, while less preferred from the standpoint of ease of assembly and structural integrity, the crossbars and the interconnecting bars representing the preferred elements of the cross frame structure 30 can be bolted or otherwise releasably secured (as opposed to a non-releasably arrangement such as the above noted welded or molded embodiments).

FIG. 2 also illustrates a preferred embodiment, wherein, the cross-frame structure to connection bar securement means provides for cross-bar 33a being positioned so as to be generally commensurate with the free end of the connection bar (e.g. an outer side of bar 33a being within 0 to 6" inches of the free end of connection bar 22) while the second more internal cross-bar 33b has a center that is located in an intermediate location of the connection bar (intermediate being, for example, within 3 inches of the true center point of elongation of the connection beam with a true center location being preferred). Because of the preferred integrated or unitary nature of the cross frame structure 30, the two connection locations between the respective crossbars and the preferably underlying connection bar results in torsion absorption in that the spaced apart connection points of the unitary cross frame structure to the connection bar precludes rotation of the cross frame structure relative to the connection bar.

For low weight, packaging and shelf space minimization purposes, for example, the direction of elongation of the cross-bars is made less than the typical bicycle front and rear wheel contact points C1, C2 (FIG. 8) with respect to a bike underlying support surface(s) (side rails in this instance which are described below). The relationship of having the bike's underlying (or lower bike level) support (e.g. two tire contact points) surpass the length of the cross-bars along a common axis is depicted in FIG. 8. The arrangement in FIG. 8 also illustrates having an intermediate support structure (the cross frame structure) which does not extend sufficiently far out for the purpose of bike tire or wheel axle slot contact support (either not to one or not to both such contact points), but instead provides a stable, more centralized platform off from which underlying bike support means extend and are supported (e.g. directly secured). In a preferred embodiment, the support means is comprised of one or more side rails supported by the cross frame structure. The present invention thus, preferably includes at least one side rail and preferably two (one on each end) extending off from ends of each of the cross-bars. In this regard, reference is made to FIGS. 1 and 2 wherein side rails 50 and 51 are shown extending off from opposite ends of cross-bar 33a, while side rails 52 and 53 are shown extending from opposite ends of cross-bar 33b.

The connection bar 22, the cross frame structure 30 and side rails 50, 51, 52 and 53 are preferably arranged to respectively extend along a horizontal plane upon assembly into operative position, with a preferred embodiment featuring the connection bar and cross frame structure sharing a common horizontal contact plane therebetween. The side rails and respective cross-bars also preferably share a common horizontal contact plane therebetween upon assembly. For added support surface, the cross frame structure is preferably secured to the upper surface of the connection bar. With this arrangement between the cross-bars and connection bar, it is preferable to have the side rails secured to an underside of the cross-bar ends as this provides for vertical compactness in the assembled bike carrier and a lower bike positioning for added rear window visibility. In an alternate embodiment of the invention, the side rails are positioned in an above stack position relative to the crossbar (see FIG. 7 for a side rail above stack position) or in the aforementioned telescoping arrangement (not shown) which represents an additional alternate embodiment of the invention.

The attachment means for attaching the side rails to each end of each of the cross-bars is preferably the same for each side rail/cross-bar combination and designed to prevent rotation. FIG. 3 shows attachment means (35, 37, 39 and 41) each comprised of a pair of through holes spaced apart at each cross-bar end (e.g. within an outer ¼ to ⅙ side rail length region inward from a free end of the side rail), a bolt or other fastener can be inserted through each of the aligned hole sets spaced apart on both the cross-bars and side rails. Thus, as shown in FIG. 2 for example, each pair of spaced apart aligned bolt holes sets (35, 37, 39 and 41) corresponds with aligned bolt holes 43 in the ends the respective side rails. This arrangement ensures that the central axis of elongation of the cross-bar, and that of a connected side rail(s), falls on a common vertical, bisecting plane.

Figure 5:
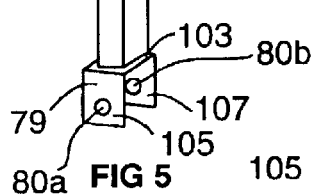
FIG. 5 shows a perspective view of one of the stabilizer bars shown in FIG. 1.

With reference to FIGS. 1, 2 and 5, stabilizing bars 73 and 74 are shown in a pre-attachment (FIG. 2) and pre-adjustment (FIG. 5) state relative to respective interconnecting bars 34a and 34b which represent the preferred attachment members for the stabilizing bars. As best shown in FIG. 5, stabilizing bars 73, 74 are universal in a preferred embodiment of the invention in that they either or both can be used on the interconnecting bars 34a and 34b (or on some of the other carrier components if the circumstances suggest such as a cross-rail or cross-bar, although the interconnecting bars are preferred as an attachment location for bike stabilization purposes).

As shown in FIG. 5, each stabilizing bar 73(74) preferably comprises, a main beam 101 having free end (vertical top when mounted) 76(78) and a base to which is connected (e.g. a weld or bolt connection) support bracket 79 having top 103 and two side walls 105,107 extending down vertically from opposite edges of top 103. The side walls also preferably include aligned holes 80a, 80b as adjustment position fixation means such as a bolt and nut combination ("b" in FIG. 2). The support bracket is preferably designed such that the spacing between walls 105 and 107 generally conforms to the thickness of the supporting interconnecting bar with the aligned holes of the position fixing means preferably lying on the side wall for below extension of the compression generating means so as to facilitate sliding into position the stabilizing bar and making a final locking position adjustment such as by tightening a bolt.

The total height of the stabilizing bar(s) 73, 74 is preferably sufficient to extend to an intermediate region of a supported bike's height or higher such as at an intermediate level of the typical adult frame segment sloping down to the hub from the handle stem region and similarly an intermediate level of the frame segment that is typical on many bike configurations extending between the seat and hub (e.g. a height extension of 15 to 30 inches above the support brackets top plate 103). In a preferred embodiment, the total height of each stabilizer bar is the same as that of the side rails and/or connection bar and/or cross-bars (e.g. a 1"×1" main beam and a total length including the support bracket of 23").

As best shown in FIG. 5, stabilizing bars 73(74) further comprise a strap and/or lock thread through device 75(77) such as the illustrated closed (bent) bar forming a closed, partial loop having ends secured (e.g. welded) to the main beam 101. Through these loops, there is threaded fastening straps or locks ("strapping" ST in general) as shown in FIG. 7 which form a strap loop (upon loop ends securement) sufficient to extend about an adjacent component of a bike to be supported such as one of the aforementioned bike frame sections. As further shown in FIGS. 2 and 5, loops 75(77) are preferably arranged on a side of main beam 101 which is in common with one of the support bracket's side walls such that the loops 75,77 can be arranged facing each other across the open area between the interconnecting bars. This arrangement is preferable in that it facilitates threading of strapping of a strap to one or more bikes positioned between/adjacent the stabilizing bars, if so desired. That is, the noted arrangement facilitates strap threading in that the loop opening is opened up to the user in a front to back orientation.

As shown in FIG. 8, the stabilizing bars are preferably positioned at different front-to-back locations on their respective interconnecting bars as to define a bike or bikes stabilizing arrangement with the bike extending to the left and right of each in assuming their support position relative to the stabilizing bars. FIG. 8 illustrates an arrangement where a single bike is loaded on the interior (closest to the vehicle) pair of side rails and one of the stabilizing bars (the right one in FIG. 8) is positioned immediately adjacent the bike to hub frame section H of the bike and where a flexible strap (or lock) ST is threaded through the stabilizing bar loop for encompassing that section of bike frame. Although not shown in FIG. 8, a mounting of a second bike would typically involve placing the handle bar end to the right side so as to avoid handle bar to handle bar contact for the multiple bikes. With this arrangement, the same (generally vertical and more vertical than the handle stem to hub frame section I) frame section H of the second bike would be immediately adjacent the other stabilizing bar (as opposed to the more inclined frame section I) for strap or lock engagement therewith. Note that this arrangement can readily handle a wide variety of bikes such as a 15 inch wheel children's bikes to 27 inch wheel diameter larger adult bikes as the generally vertical or only slightly inclined frame structure H would assume a generally close position to the loop section of the stabilizer bar regardless of the bike size so as to provide for securement therewith.

FIG. 8 also illustrates a side rail below stack arrangement relative to the cross-bars whereby an adult size bike does not significantly block rear window view. FIG. 7 illustrates an alternate above stack arrangement wherein the cross rails 50, 51, 52, and 53 are mounted above the cross-bars of cross frame structure 30 and held in place by fasteners A (which can be similar bolt-nut combination as B but for a preferred shorter length in view of the disparity in total vertical stacking thickness illustrated).

FIG. 7 also shows an alternate embodiment of stabilizing bars 73' and 74' wherein flanges F are utilized in place of adjustable support brackets and each stabilizing bar is centrally mounted wherein strap sizing can accommodate the front to rear stabilizing bar to bike spacing. Bolts C or the like can be used to fix in position the stabilizing bars, and although not shown, a series of adjustment bolt reception holes can be provided along the length of the interconnecting bar(s) 34a' and 34b'.

Figure 4:
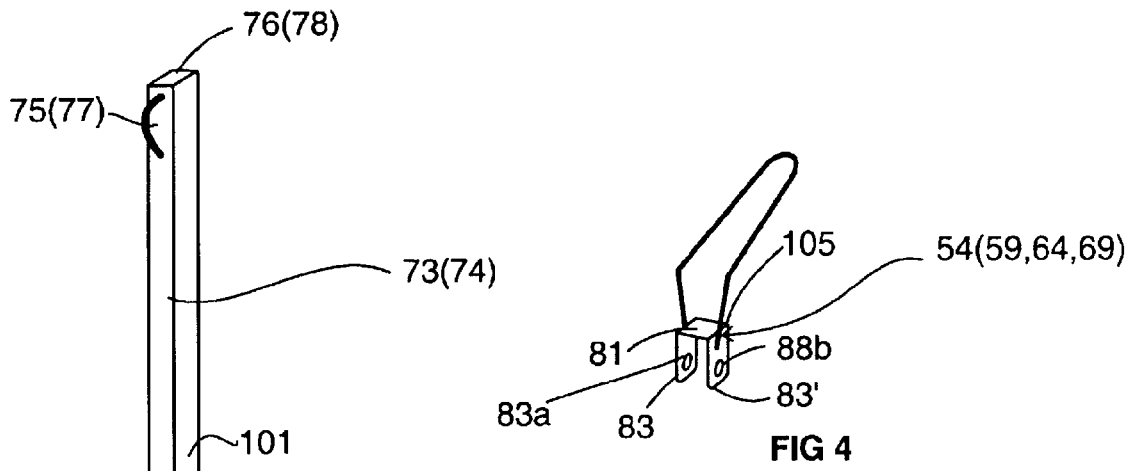
FIG. 4 shows a perspective view of one of the tire support cradles shown in FIG. 1.

FIG. 4 provides an enlarged view of a preferred embodiment of one of the preferably commonly designed adjustable cradles 54, 59, 64, 69 which are adjustable along respective supporting side rails such as between respective free ends 55, 65, 70 and 60 of the side rails and the abutment location represented by the outer free ends of the cross-bars 36, 38, 40 and 42. FIG. 4 further illustrates a similar adjustable compression bracket position fixing means as with the stabilizing bars featuring bracket 59 with top wall 81 side walls 83,83' and bolt mounting holes 83a and 83b.

Figure 9:
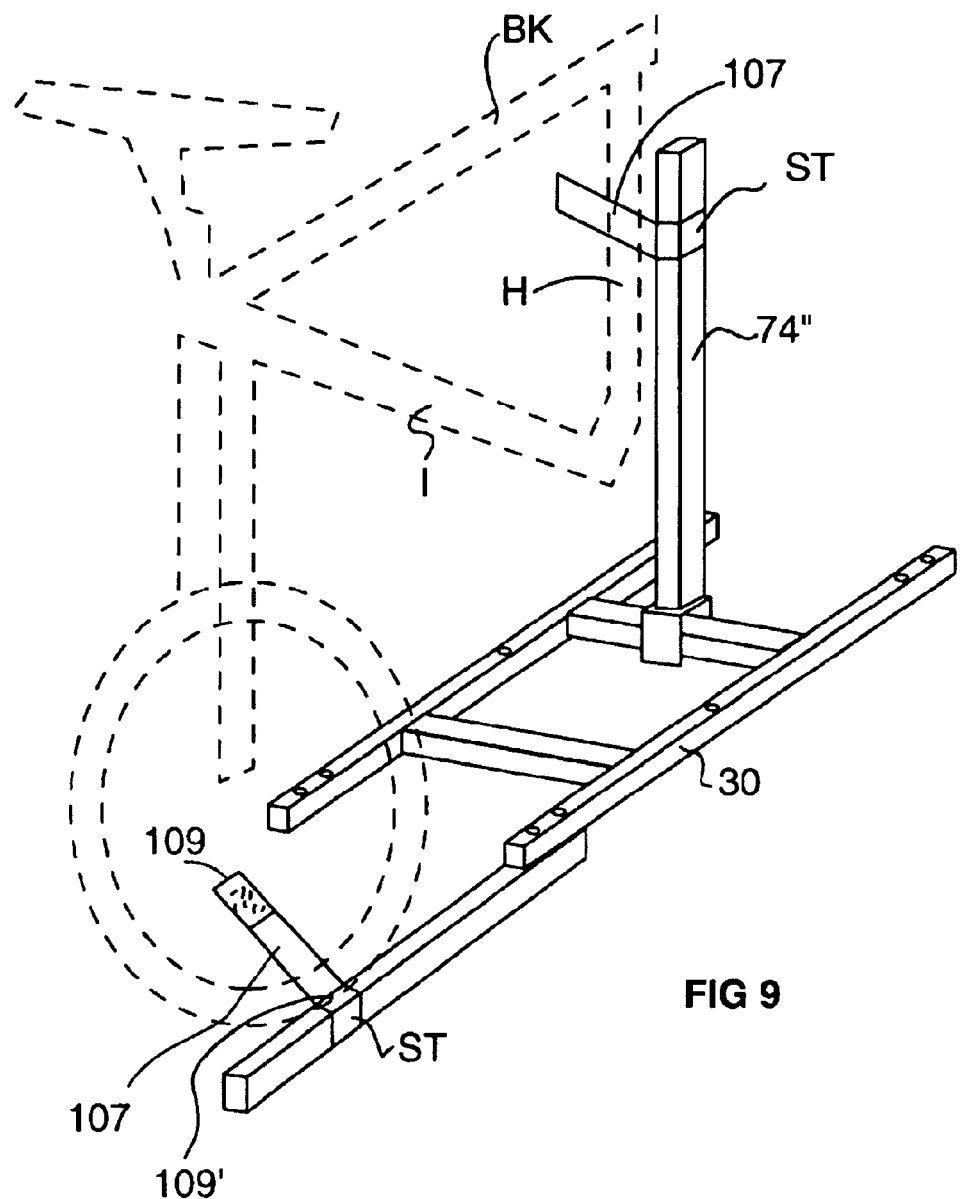
FIG. 9 shows an illustration of a strap suitable for universal use relative to wheel hold down and stabilizing bar stabilization.

FIG. 9 provides an enlarged view of strap ST featuring flexible strap body 107 having opposite ends 109, 109' and strap closure means 111 such as a VELCRO® fastener, a mechanical claps or buckle or the like. In FIG. 9 strap end 109' is defined by a metal loop through which opposite end 109 extends with end 109 having a VELCRO® fastener patch for attachment to a corresponding patch (not shown) on the strap. Strapping ST is shown as a strap that is universal from the standpoint it is sufficiently sized and arranged for use with either a stabilizing bar loop or as a tire rim hold down (either alone or in conjunction with a cradle). As shown in FIG. 9, strap ST is preferably wrapped around frame bar H of bike BK (shown only partially—remainder being in front of bar 74") and then secured such as described above.

Figure 10:
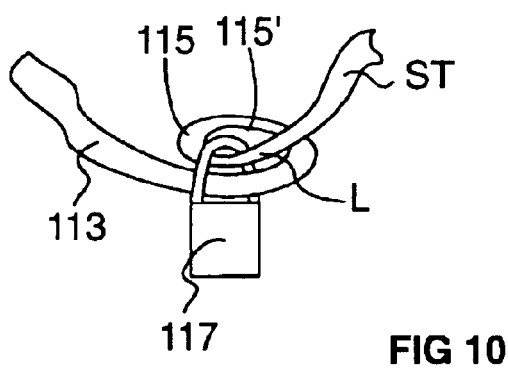
FIG. 10 shows in cut-away a lock for use with one or more of the stabilizing bars.

FIG. 10 illustrates lock L which can be used either as strapping ST (i.e., in place of) or in conjunction with the strap version of strapping ST threaded through the loop of the stabilizing bar. Lock L features a flexible member 113 (ends only shown having looped ends 115,115' which locking device 117 clasps). A variety of locking devices are suitable for use under the present invention including also the non-flexible type available on the market. Depending on its length, lock L can be threaded through the loop of multiple stabilizing bars to secure multiple bikes or individual locks L can be used in association with individual stabilizing bars.

Figure 6:
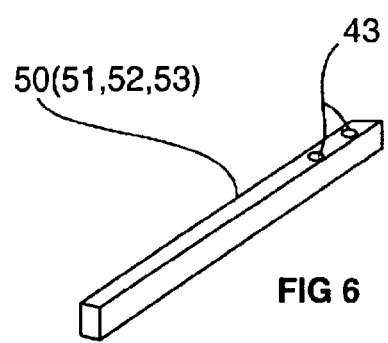
FIG. 6 shows an illustration of a preferred side rail embodiment.

In a preferred method of assembly, the carrier 20 of the present invention is assembled from the following materials.
A) Fasteners such as
  i) 2 large sized (e.g. 3½") carriage bolts, nuts, washer sets
  ii) 8 medium sized (e.g. 2½") carriage bolt, nut, washer
  iii) 6 small sized (e.g. 1½") carriage bolt, nut, washer sets
B) a connection bar (22)
C) a cross frame structure (30)
D) 4 side rails (50, 51, 52, 53)
E) 2 stabilizing bars (73, 74)
F) 4 cradles (54, 59, 64, 69)
G) 6 tie straps (105)
H) 14 square 1" plastic end caps (P-FIG. 6)

The preferred method of assembly sequence includes:
1) inserting the protective end caps P in the open ends of each end of the side rails, each end of the cross-bars and the top of each stabilizer bar.
2) slide the preferably 2"×2"×23" square tubing connection bar 22 into the receiver hitch of vehicle V with the smaller holes 26,29 on the top and bottom.
3) place the cross frame structure 30 on top of the connection bar 22 with the square bolt holes (e.g. 90,92) facing up and round holes (not shown) facing down.
4) align the two parts 22 and 30 using the center holes of the cross bars and secure at each location with a large bolt, nut and washer, using a ½" wrench or socket, for example, a 2"×2"×23" square tubing.
5) align all four preferably 1"×1"×23" square tube side rails underneath the four ends of the cross bars of the cross frame structure and secure with the medium bolts, nuts and washers, using, for example, a 9⁄16 wrench or socket.
6) place each stabilizing arm 73,74 on the respective shorter, interconnecting arms 34a, 34b of the cross bar. Secure with medium bolts with the exact position being determined by the size of the bike(s) being carried.
7) place each of the four tire support brackets or cradles (e.g. 59) onto each of the side rails.
8) secure each tire support bracket in position by inserting the small bolts, nuts and washers through the cradle support brackets and tightening.
9) attach two of the straps through the loops of the stabilizing arms. Attach the other four straps to the tube where the bike's back and front tires will be placed (or only one of the front and back tires in view of the cradle forward retention).
10) once the carrier components are attached, the bike can be placed on the carrier and the tire support brackets adjusted by sliding them firmly against the front and back tires and secured in position with the small bolts. Tie straps are then wrapped around the side rail and looped through the tire. The remaining tie straps are then treaded through the stabilizing bar loops and tightened around the bike frame.

The applicable above assembly steps or any subsets thereof can be carried out prior to the initial insertion of the connection bar. However, the initial insertion of the connection bar into the receiver and subsequent assembly of carrier components is preferred in that it avoids having to lift heavy objects and the connection bar with or prior to cross frame structure attachment provides an advantageous height and stable platform from which to work.

While particular embodiments of this invention have been described, it will be evident to those skilled in the art that the present invention may be embodied in other specific forms without departing from the essential characteristics thereof. The present embodiments and examples are therefore to be considered in all respects as illustrative and not restrictive, the scope of the invention being indicated by the appended claims rather than the foregoing description, and all changes which come within the meaning and range of equivalency of the claims are therefore intended to be embraced therein.

What is claimed is:

1. A bike carrier, comprising:
   a vehicle connection member;
   a cross frame structure supported by said vehicle connection member, said cross frame structure extending out to opposite sides of said vehicle connection member;
   a first side rail which is releasably secured to a first extension of said cross frame structure so as to further extend out to one of said opposite sides for support of a bike on the first side rail; and
   a bike frame stabilization bar which extends up from said cross frame for bike frame contact and is adjustable from one fixed position to a second position on said cross frame by a securement device.

2. The bike carrier of claim 1, wherein said cross frame support structure further includes a second extension and a second side rail and wherein said second side rail is releasably secured to said second extension and the second side rail and second extension extend to an opposite side of said vehicle connection member for support of the bike on the second side rail.

3. The bike carrier of claim 2 wherein said cross frame structure is releasably secured to said vehicle connection member and is of a length insufficient to provide underlying contact support to the bike being supported by said side rails.

4. The bike carrier of claim 3 wherein said side rails are elongated and have a length in a direction of elongation which is equal to a maximum length of elongation of said cross frame structure along a direction of extension elongation.

5. The bike carrier of claim 1 wherein said stabilization bar has a main bar and a thread through loop member supported thereon.

6. A bike carrier, comprising:
   a vehicle connection bar;
   a cross frame structure comprised of a set of first and second cross bars that each extend to opposite sides of said connection bar and are spaced apart in a direction of elongation of said connection bar, said first and second cross bars being interconnected by first and second interconnection bars, which extend more parallel than transverse to an extension length of said connection bar and are positioned to opposite sides of said cross frame structure and said cross frame structure, with set of cross bars and interconnection bars, being supported by said vehicle connection bar;
   a first side rail supported by said first cross bar and extending further out away from said connection bar, and a second side rail supported by said second cross bar and extending further out away from said connection bar for underlying bike support.

7. The bike carrier of claim 6 further comprising third and fourth side rails with the third and fourth side rails being connected to said first and second cross bars, respectively, and with said third and fourth side rails extending out farther than said cross frame structure to an opposite side of said connection bar than said first and second side rails extend out from.

8. The bike carrier of claim 7 wherein said cross frame structure is a unitary member.

9. The bike carrier of claim 8 wherein said first and second interconnection bars are spaced apart relative to a direction of elongation of said first cross bar.

10. The bike carrier of claim 9 wherein said first and second interconnection bars are positioned as to have a common upper level with that of said cross bars.

11. The bike carrier of claim 7 wherein said first and second cross bars extend perpendicular to said connection bar and said side rails extend out from respective free ends of said cross bars to form underlying bike support locations.

12. The bike carrier of claim 6 wherein said interconnection bars extend parallel with said connection bar and are each spaced apart relative to a direction of elongation of said first cross bar.

13. The bike carrier of claim 12 wherein said first and second interconnection bars are welded to said first and second cross bars to form a unitary, double H-shaped support structure.

14. The bike carrier of claim 6 further comprising a first fastener which releasably fastens said cross frame structure to said connection bar at a location between opposing sides of said first and second interconnection bars.

15. The bike carrier of claim 14 further comprising a second fastener which releasably fastens said cross frame structure to said connection bar at a location spaced along a direction of elongation of said connection bar.

16. The bike carrier as recited in claim 14 wherein said first and second fasteners extend through respective intermediate areas of said cross bars and through respective location on said connection bar.

17. The bike carrier as recited in claim 6 wherein said cross frame structure is a unitary, double H-Shaped body.

18. The bike carrier as recited in claim 6 wherein each of said cross bars have first and second free ends and said carrier comprises third and fourth side rails with said first, second, third and fourth side rails being releasably fastened to a respective free ends of said cross bars.

19. The bike carrier as recited in claim 18 further comprising attachment means which the cross bars and side rails together at respective fastening points so as to be in a stacked relationship.

20. The bike carrier as recited in claim 11 further comprising a stabilizing bar which extends up off said cross frame structure for stabilization of a bike supported on said side rails.

21. The bike carrier as recited in claim 20 wherein said stabilization bar includes a thread through strapping connection for bike frame strapping.

22. The bike carrier as recited in claim 6 further comprising bike wheel positioning means for tire position retention relative to said side rails on which a bike tire is in contact with.

23. The bike carrier as recited in claim 22 wherein said bike carrier wheel positioning includes tire cradles adjustably supported by said side rails.

24. The bike carrier as recited in claim 23 further comprising tie down straps used in conjunction with said cradles and which are universal in length and configuration for use relative to said bike frame strapping.

25. The bike carrier as recited in claim 6 further comprising first and second stabilization bars which extend up from said cross frame structure and include sliding brackets at a base which are sized for adjustable positioning on respective interconnection bars.

26. A bike carrier, comprising:
a vehicle connection member;
a cross frame structure supported by said vehicle connection member, said cross frame structure extending out to opposite sides of said vehicle connection member, and wherein said cross frame structure is configured as a double H-Shaped body with a first pair of frame elements extending more transverse than parallel relative to a direction of extension of said connection member and a second set of frame elements extending more parallel than transverse to said connection member, and said second frame elements extending between and connected to said first pair of frame elements;
a first pair of side rails which are releasably secured, respectively, to ends of frame elements in said first pair of frame elements, and said first pair of side rails extend out for bike wheel support.

27. The bike carrier of claim 26, wherein said cross frame support structure further includes a second pair of side rails secured, respectively, to remaining free ends of said frame elements, and said second pair of side rails extend out for bike wheel support.

28. The bike carrier of claim 26, wherein said cross frame structure is releasably secured to said vehicle connection member.

29. The bike carrier of claim 28, wherein each of said side rails is elongated and has a length in a direction of elongation which is equal to a maximum length of elongation of said cross frame structure along a direction of extension elongation.

30. The bike carrier of claim 26, wherein said cross frame has a length insufficient to provide underlying contact support to opposite wheel of a bike.

31. The bike carrier of claim 26 further comprising a stabilization bar which extends up from said cross frame.

32. The bike carrier of claim 31, wherein said stabilization bar is adjustable from one fixed position to a second position on said cross frame by a securement device.

33. The bike carrier of claim 32, wherein said stabilization bar has a main bar and a thread through loop member supported thereon.

34. A method of assembling a bike carrier, comprising:
providing a vehicle connection bar;
securing a cross frame structure having a double H-shaped configuration comprising a first spaced apart set of frame elements extending more transverse than parallel relative to an extension length of said vehicle connection bar and a second set of spaced apart frame elements extending more parallel than transverse to the extension length of said vehicle connection bar and with the elements of said second set of frame elements being positioned, respectively to opposite sides of said vehicle connection bar; and
securing side rails to free ends of said elements of said first set of elements so as to provide underlying front and rear tire support means based on said side rails.

35. The method of claim 34 further comprising arranging said cross bars to extend transversely to a direction of elongation of said vehicle connection bar and said interconnection bars to extend parallel and to opposite sides of said vehicle connection bar, and further adjustably positioning stabilizing bars on said interconnection bars.

36. The method of claim 35 further comprising providing tire position maintenance means on said side rails and strapping on said stabilizing bars.

37. The method of claim 36 wherein said tire positioning means includes cradles and tire tie down strapping.

38. The method of claim 34 further comprising securing a stabilizing bar which extends up off said cross frame structure for stabilization of a bike frame of a bike supported on said side rails.

39. The method of claim 34 further comprising providing a cross frame structure that is a unitary, welded together member.

* * * * *